United States Patent [19]

Dugas

[11] 4,084,465
[45] Apr. 18, 1978

[54] SUGAR CANE PLANTER

[76] Inventor: Clet Dugas, Box 535, Loreauville, La. 70552

[21] Appl. No.: 702,028

[22] Filed: Jul. 2, 1976

[51] Int. Cl.² .............................................. B23D 53/00
[52] U.S. Cl. ...................................... 83/103; 83/150; 83/161; 83/167; 83/401; 83/449; 83/524; 83/801; 83/928
[58] Field of Search .................. 111/2, 3; 214/82; 221/135, 30; 83/165, 166, 167, 928, 161, 202, 222, 401, 420, 794, 801, 449, 564, 103, 524

[56] References Cited

U.S. PATENT DOCUMENTS

| | | | |
|---|---|---|---|
| 513,807 | 1/1894 | Olivera et al. | 111/59 |
| 845,212 | 2/1907 | Baron | 83/356.2 |
| 849,945 | 4/1907 | Van Sise | 83/165 |
| 1,246,976 | 11/1917 | Merwin | 83/98 X |
| 1,363,445 | 12/1920 | Virtue | 83/98 |
| 1,778,639 | 10/1930 | Klingele | 83/491 X |
| 2,723,668 | 11/1955 | Pool | 83/355 X |
| 3,078,886 | 2/1963 | Childress | 83/795 X |
| 3,344,830 | 10/1967 | Longman | 111/3 X |
| 3,414,027 | 12/1968 | Larva, Sr. et al. | 83/928 X |
| 3,468,441 | 9/1969 | Longman | 111/2 X |
| 3,494,389 | 2/1970 | Thibodeau | 83/928 X |
| 3,604,479 | 9/1971 | Jordan | 83/928 X |
| 3,623,519 | 11/1971 | Radle | 144/3 D |
| 3,648,553 | 3/1972 | Tuschy | 83/98 X |
| 3,718,060 | 2/1973 | Carlton | 83/928 X |
| 3,832,928 | 9/1974 | Copeland | 83/928 X |

Primary Examiner—J. M. Meister
Attorney, Agent, or Firm—Berman, Aisenberg & Platt

[57] ABSTRACT

A sugar cane planting machine for eliminating the excessive manual labor previously required to plant sugar cane stalks. The uncut stalks are loaded in the rear of a tractor-pulled cart at the bottom of which is positioned a conveyor-like belt for moving the cane towards the front of the cart. Slideably attached on a transversely positioned guide member of a pivotable frame at the front of the cart is a combination cross-cutting and kicker-chain assembly which moves laterally across the width of the cart under hydraulic controls. Said assemblies include a downwardly extending chain saw which is followed by at least one vertically disposed kicker-chain, both preferably under the control of a common motor. Below the kicker-chain assembly is positioned a trough or hopper having an opening formed along the bottom thereof. After the stalks of the sugar cane have been loaded and extend across the cross-cutting path over the hopper, the assemblies are actuated to move the chain saw and kicker-chain laterally across the cart to cut the stalks into portions of planting length. The cut sections fall through the hopper to a pre-formed furrow in the ground. The following kicker-chain assembly assists in ensuring that the cut sugar cane does not become entangled and is properly downwardly displaced to fall through the hopper. After the cross-cutting and kicker-chain assemblies have made a complete traversal of the width of the cart, and the cut pieces have been distributed as desired, a hydraulic actuator retracts the assemblies to their starting position and the process is repeated.

23 Claims, 5 Drawing Figures

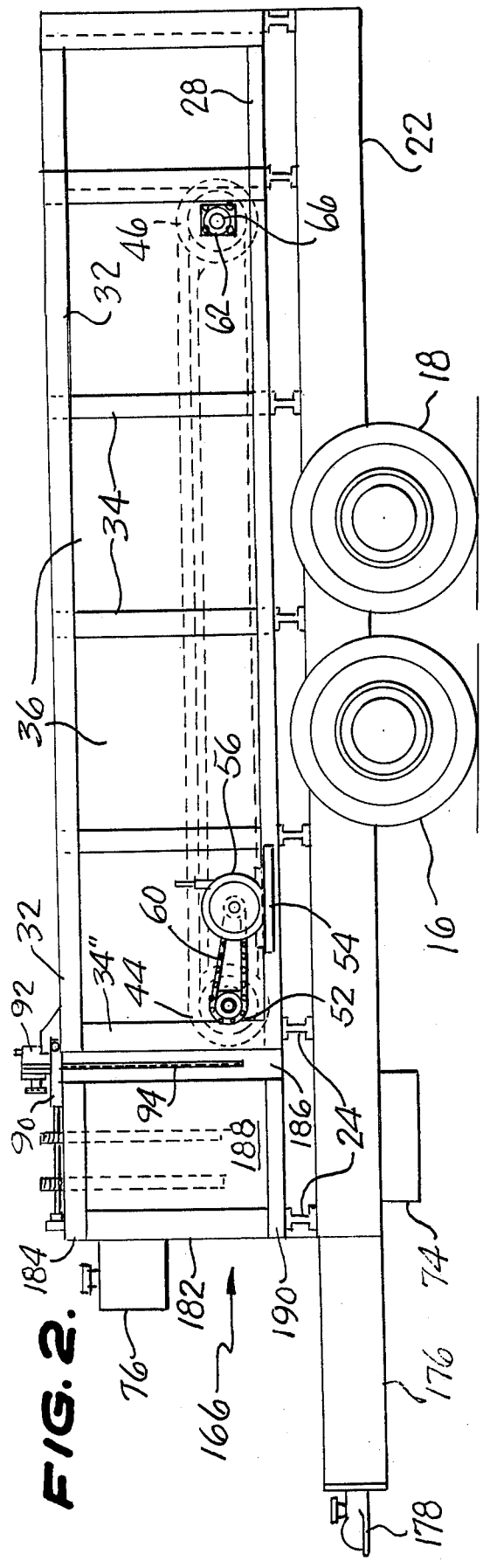
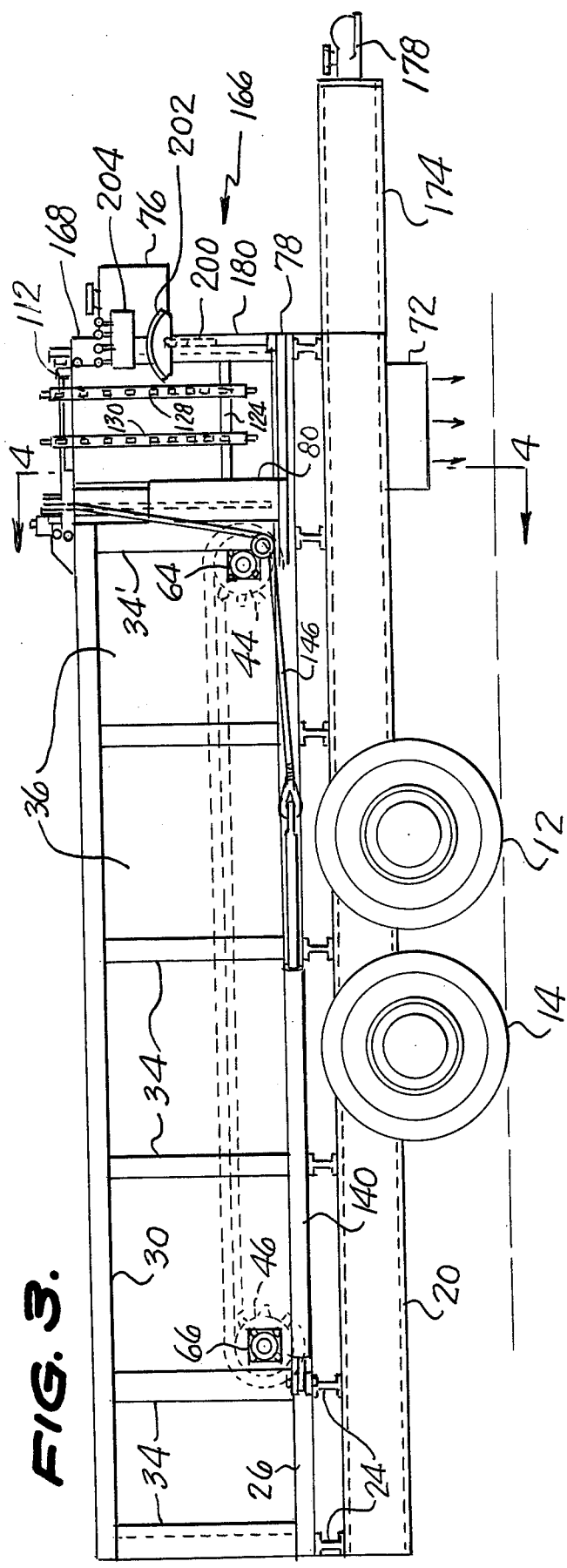

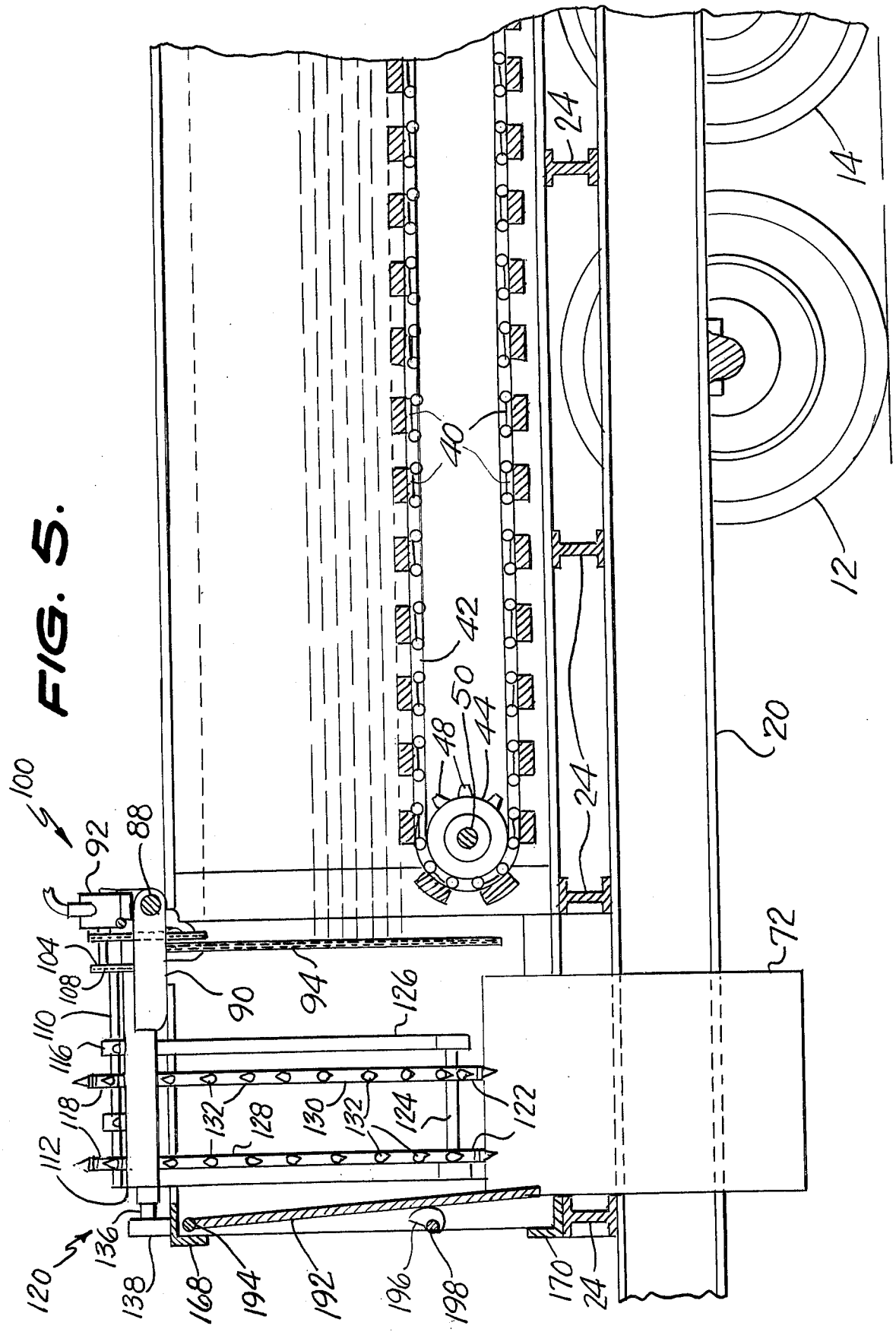

SUGAR CANE PLANTER

BACKGROUND OF THE INVENTION

1. Field of the Invention

The present invention is related to sugar cane planting machines and, more particularly, is directed to a tractor-pulled cart which cuts long sugar cane stalks to plantable sizes and then distributes same to pre-formed furrows in the ground below.

2. Description of the Prior Art

Prior art techniques for planting sugar cane have relied excessively upon manual labor. Uncut sugar cane stalks are approximately 5 to 6 feet long and are generally stored in a wheeled cart from which they are manually withdrawn for planting. Since the cane stalks are frequently bent, and sometimes quite leafy, they have a tendency to become entangled in the cart, thus making the manual process of removing them cumbersome and time-consuming. After being withdrawn from the cart, the long stalks must be placed in a trench formed in the planting row. Once this occurs, any crooked sections of the cane stalks must be cut, and the leaves removed, in order to ensure that they will lie flat when placed in the trench. Thus, it may be appreciated that manual unloading and planting of sugar cane stalks has been and continues to be a tedious and time-consuming process.

Several sugar cane planting machines, which purport to overcome the disadvantages noted above with respect to manual planting of sugar cane, have been suggested, as exemplified by the following prior art United States patents of which I am aware:

385,234; 513,807; 1,618,958; 1,764,159; 1,785,743; 1,908,548; 2,841,103; 3,073,265; 3,279,400; 3,387,745; 3,404,808; 3,465,902; 3,468,441; 3,702,664; and 3,907,135.

Exemplary of the foregoing is the Arceneaux Pat. No. 2,841,103 which illustrates a sugar cane planting apparatus which plants the sugar cane after having cut it preparatory to planting. The cutting is achieved by a plurality of circular saws which are spaced along a shaft, a V-shaped member forming a guide for directing the horizontally-disposed sugar cane stalks onto the saws. The sections of cut sugar cane pass between a pair of triangular blocks and are then picked up by pockets and are upwardly transported to be discharged into a rearwardly and downwardly inclined trough.

The Gonzales Pat. No. 3,279,400 is also of interest in illustrating a device for cutting and planting sugar cane which includes means for cutting the long sugar cane stalks into seed-sized segments, means for planting these segments into a furrow, and means for closing the furrow.

Such planting machines, which are allegedly improvements over manual planting techniques, are nevertheless deficient in several particulars. Generally speaking, the planting machines heretofore developed and suggested by the prior art patents are overly complex and therefore tend to be unduly expensive. In attempting to perform too many functions, such machines have a tendency not to perform well at all. Further, the sugar cane stalk holding, cutting and distributing designs of the prior art tend to entangle, rather than disentangle, the long cane stalks within the cart to inhibit their proper and cutting and distribution. What is therefore badly needed is a sugar cane planting machine which simplifies and makes more practical the storage, cutting and distribution of sugar cane stalks to planting furrows.

OBJECTS AND SUMMARY OF THE INVENTION

It is therefore a primary object of the present invention to provide a sugar cane planting machine which overcomes all of the disadvantages noted above with respect to the manual planting of sugar cane.

A further object of the present invention is to provide a machine for planting sugar cane which is a great improvement over prior art sugar cane planting machines in simplifying and practicalizing the storage, cutting and seed-delivering techniques required of such planters.

Another object of the present invention is to provide an improved sugar cane planter which is of simple and inexpensive construction, utilizes commonly available parts and elements, may be built and constructed without requiring special tools or fabricating techniques, and which is adapted to be drawn by a tractor.

An additional object of the present invention is to provide a tractor-drawn sugar cane planting machine which utilizes a single cutting element which may be repeatedly actuated to successively cut long sugar cane stalks into desired seed-like lengths for subsequent planting.

A still further object of the present invention is to provide a wheeled sugar cane planting machine which utilizes hydraulic controls for simplifying and mechanizing the storage, conveying, cutting and distributing operations associated therewith.

A still further object of the present invention is to provide an automated sugar cane planting machine which incorporates means for directing the cut portions of sugar cane into pre-formed furrows.

An additional object of the present invention is to provide a sugar cane planting machine in which the cane loading, conveying, cutting and distributing operations are under the control and supervision of a single operator.

A still further object of the present invention is to provide a sugar cane planter which eliminates the need for recutting the stalks once they have been dropped into the planting furrows.

A still further object of the present invention is to provide a sugar cane planting machine which incorporates power-assisted means for ensuring that the cane once cut, does not become entangled preparatory to planting.

The foregoing and other objects are attained in accordance with one aspect of the present invention through the provision of a sugar cane planter which comprises means for receiving the sugar cane stalks to be cut, means mounted on the receiving means for cutting the stalks of sugar cane, and means which are operatively connected to the cutting means for moving sugar cane across the width of the receiving means transversely to the longitudinally placed sugar cane stalks positioned therein. In a preferred embodiment, the sugar cane stalk receiving means comprises a wheeled vehicle or cart having substantially parallel side walls which define a stalk receiving area therebetween. Positioned in the stalk receiving area are means for conveying the uncut stalks from, for example, the rear of the cart towards the front of the cart, where the cutting means are disposed. In a preferred embodiment, the conveying means comprises a flexible belt-type flooring which is mounted and wrapped about a forwardly and rearwardly disposed axle upon which appropriate sprocket wheels are operatively engaged with the flooring and with a driving motor.

In accordance with other aspects of the present invention, the cutting means is positioned on a cutting assembly which is located adjacent one end of the vehicle. The cart or the vehicle includes hopper means positioned below the cutting assembly for delivering the cut sugar cane to the furrows pre-formed in the ground therebelow. In a preferred embodiment, the hopper means comprises a pair of guide plates which are respectively attached to the parallel side walls of the cart and which extend downwardly therefrom towards one another at an angle of inclination so as to form a cane-receiving aperature therebetween.

In accordance with other aspects of the present invention, the cutting assembly is transversely positioned across the top end of the forward portion of the cart, and is pivotable about one end thereof between a cutting position transverse to the side walls of the cart to a loading position which is substantially parallel to the side walls. The cutting assembly preferably includes means positioned above the hopper means for urging the cut sugar cane downwardly to prevent entanglement thereof. The downwardly urging means in a preferred embodiment comprises kicker-chain means operatively connected to the means for transversely moving the cutting means so as to be moved therewith.

The cutting assembly comprises means for supporting the cutting means and the kicker-chain means, end support means positioned adjacent to the parallel side walls, and means extending between the end support means for guiding the supporting means therebetween. In accordance with a preferred embodiment, the cutting means comprises an elongated chain saw which is attached to the supporting means and extends downwardly therefrom. The chain saw is angled downwardly and forwardly of its point of attachment to the supporting means. The kicker chain means includes a support frame which extends forwardly from the supporting means, upon the latter of which is mounted means for concurrently driving the cutting means and the kicker chain means.

In accordance with yet other aspects of the present invention, the means for moving the support means transversely across the top of the cart includes hydraulically-operated means for selectively moving the supporting means along the guiding means between the end support means. The kicker chain means comprises at least one kicker chain which is substantially vertically disposed onto the cutting assembly and which is spaced laterally of the chain saw so as to follow behind the chain saw when the supporting means is moved transversely across the vehicle to cut the sugar cane stalks positioned forwardly thereof. Connected to one of the end supports of the cutting assembly are pivot means for pivotal movement of the entire cutting assembly and kicker chain assembly between a cutting position transverse to the side walls to a sugar cane loading position when it is parallel to the side walls to permit the sugar cane stalks to be initially loaded in the cart.

BRIEF DESCRIPTION OF THE DRAWINGS

Various objects, features and attendant advantages of the present invention will be more fully appreciated as the same become better understood from the following detailed description thereof, when considered in connection with the accompanying drawings, in which:

FIG. 2 is a side plan view which illustrates what will be referred to as the right side of the sugar cane planter of FIG. 1;

FIG. 3 is a side plan view illustrating what will be referred to as the left side of the preferred embodiment sugar cane planter illustrated in FIG. 1;

FIG. 5 is a sectional view which illustrates in greater detail the kicker-chain and cross-cutting assemblies, a well as the conveyor-type flooring in accordance with the preferred embodiments of the present invention, and which is taken along line 5—5 of FIG. 4.

DETAILED DESCRIPTION OF THE PREFERRED EMBODIMENT

Figure 1:
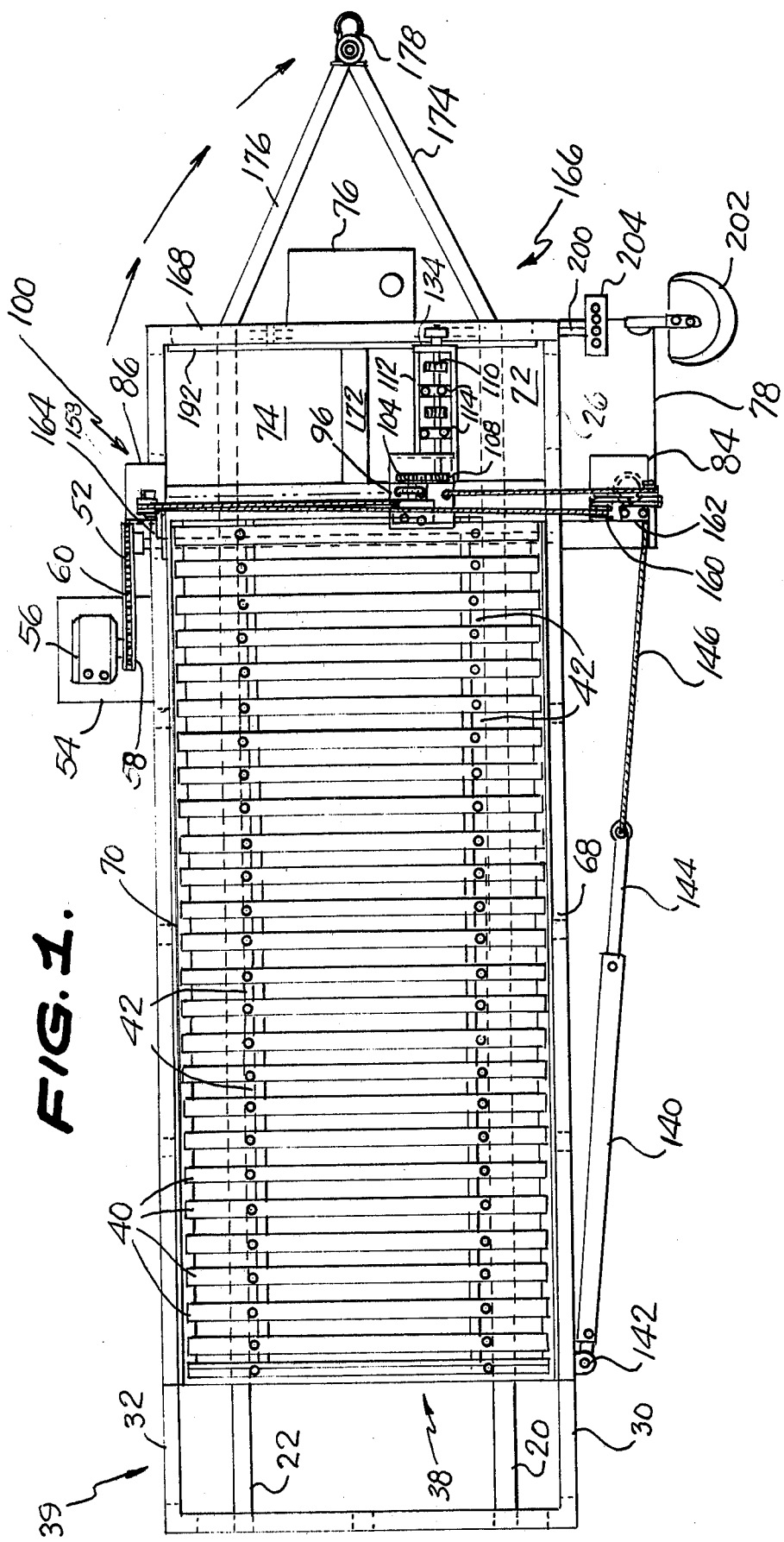
FIG. 1 is a top plan view of a preferred embodiment of the sugar cane planting machine of the present invention.

Referring now to the drawings, wherein like reference numerals represent identical or corresponding parts throughout the several views, and more particularly to FIGS. 1 through 3 thereof, a preferred embodiment of the sugar cane planting machine according to the present invention is illustrated in respectively a top, right, and left plan view and is seen to consist essentially of a tractor-pulled wheeled vehicle within which the sugar cane stalks are loaded, cut, and delivered to the pre-formed furrows in the ground therebelow.

Figure 4:
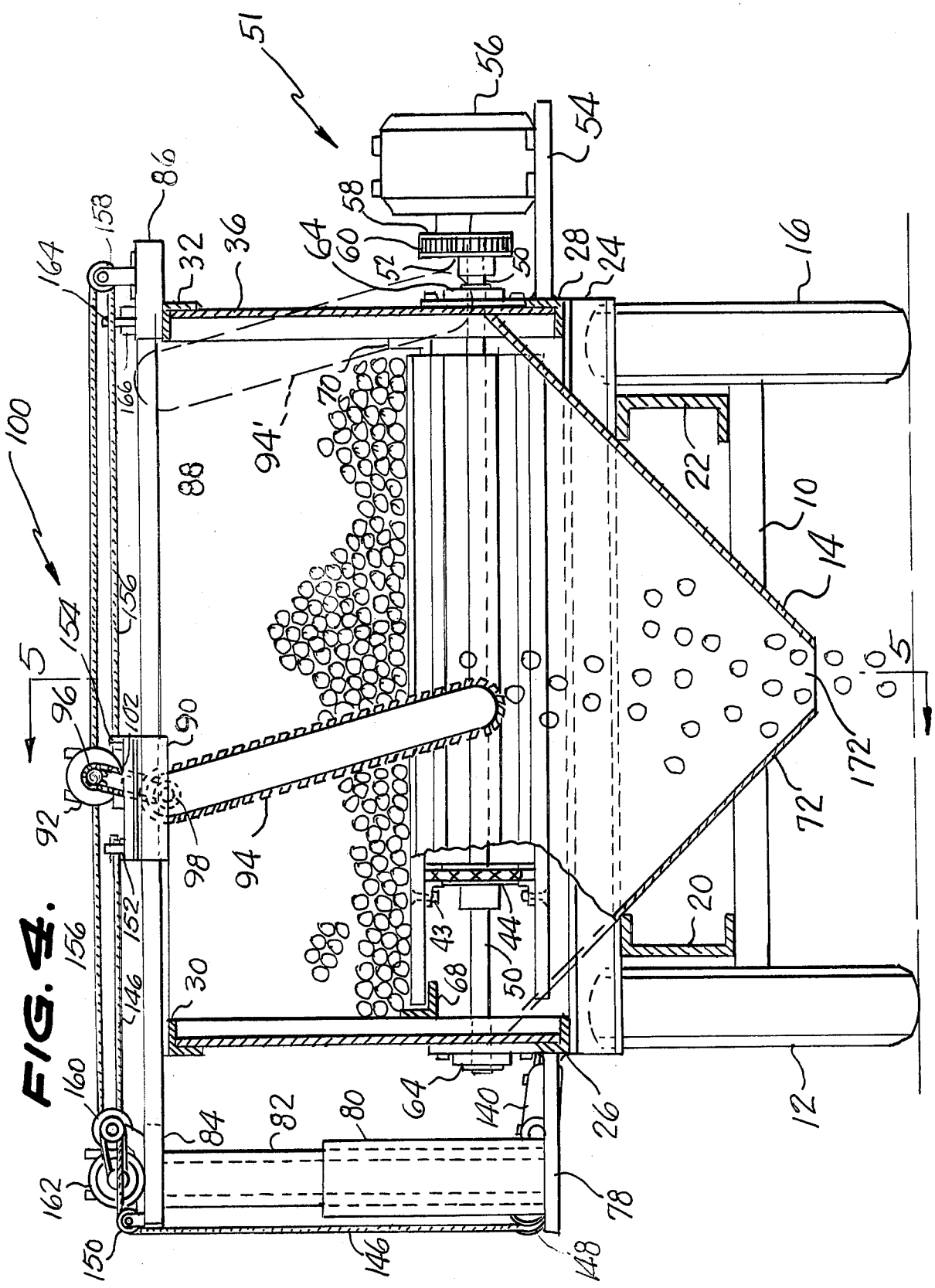
FIG. 4 is an enlarged sectional view which illustrates the cross-cutting assembly in greater detail and which is taken along lines 4—4 of FIG. 3.

As seen in FIG. 4, the planter has a forward axle 10 to which the forward wheels 12 and 16 are mounted in a conventional fashion. To the rear axle (not shown) are mounted the rear wheels 14 and 18, also conventionally.

The basic frame assembly of the planter of the present invention comprises a pair of substantially parallel main frame members 20 and 22 which extend longitudinally from the front to the rear portion of the planter, and may, for example, comprise a pair of channel irons. Positioned transversely to the main frame members 20 and 22 are a plurality of support frame members 24, which may be comprised of convention I beams and are preferably welded to members 20 and 22.

A pair of lower side wall support members 26 and 28 are mounted to the tops of the transverse frame members 24. A pair of upper side wall support members 30 and 32 extend in the same fashion and parallel to the lower members 26 and 28 and are held in a spaced relationship thereto by virtue of the provision of a plurality of vertically-oriented side wall support members 34. To the vertical leg of the longitudinal side wall support members 26, 28, 30 and 32, as well as to the vertical side wall support members 34, are mounted a plurality of side wall sections 36, which may comprise, for example, steel plates welded on their peripheries to the individual support members.

It may be seen in FIG. 1 that the left and right upper side wall support members 30 and 32 extend from the rear of the planter forwardly to a point short of the forward hopper assembly structure indicated generally by reference numeral no. 166.

Forward hopper assembly structure 166 comprises a transverse upper front support member 168 and a similar and parallel transverse lower support member 170, the latter of which is mounted on top of frame member 24 (FIG. 5). A pair of angled extensions 174 and 176 are firmly secured to the forward ends of main frame members 20 and 22, respectively. Positioned at the apex of extensions 174 and 176 is a conventional tractor hitch 178.

The forward hopper assembly 166 also includes a pair of left and right vertical support members 180 and 182 which form the corner posts for the front of the sugar cane planter of the present invention. Extending rearwardly from transverse upper front support member 168 are a pair of upper and lower horizontal support members 184 and 190, whose lengths stop short of meeting side wall support members 32 and 28, respectively, so as to define an opening 186 (FIG. 2) between adjacent vertical post 34" and a right side wall section 188. Sidewall section 188 is connected to cooperating support members 182, 184 and 190 at its edges.

Note that the left side of the forward hopper assembly 166, as viewed in FIG. 3, is devoid of a side wall section so as to define an opening between vertical post 34' and corner support post 180, for a purpose which will become more clear hereinafter.

As illustrated in FIG. 5, the forward hopper structure 166 is provided with a substantially planar front door 192 which is hinged at its upper edge about pivot 194 so as to be laterally pivotable thereabout. Positioned towards the bottom edge of door 192 are means for opening same which comprise a pivot shaft 198 which is mounted through the vertical support posts 180 and 182 of forward hopper assembly 166. Mounted about pivot shaft 198 are one or a plurality of cams 196 (FIG. 5) which abut the outside surface of door 192. Shaft 198 is externally rotatable by virtue of a handle 200 (FIGS. 1 and 3).

As best seen in FIGS. 1 and 5, a conveyor-type flooring, indicated generally by the reference numeral 38, is disposed between the parallel side walls of the planter and extends from a point forward of the rear of the cart to a point approximately the same distance rearwardly of the frontal portion thereof. For example, if the overall length of the sugar cane stalk handling cart (equivalent to the length of main frame members 20 and 22) is approximately 16 feet, the conveyor-type flooring 38 would be approximately 12 feet long, leaving a rearward space 39 of approximately 2 feet and an equally dimensional frontal portion at which is positioned the forward hopper assembly structure 166, as indicated above.

The conveyor-type flooring 38 comprises a plurality of parallel slats 40, which are arranged in an endless belt type of configuration. Slat 40 may be, for example, conventionally attached in a transverse manner to a pair of parallel flexible belts 42 which run longitudinally through the cart. The mode of attachment of the slats 40 to the belts 42 may be as indicated generally by reference numeral 43 in FIG. 4.

Means for driving the conveyor-type flooring 38 comprises a pair of sprocket wheel driving shafts 50 and 62 located respectively forwardly and rearwardly of the flooring 38. A pair of sprocket wheels 44 are mounted on the ends of front shaft 50, sprocket wheels 44 having a plurality of teeth 48 for engaging the openings in the conveyor belts 42 (FIG. 5). Mounted on the rear shaft 62 at the ends thereof are a pair of sprocket wheels 46 which engage the conveyor 38 in a similar fashion. The front shaft 50 is supported through the associated side wall sections 36 by a pair of bearings 64 mounted externally, which may, for example, be of the pillow-block type. A similar pair of pillow-block type bearings 66 support the rotation of the rear shaft 62.

The conveyor flooring 38 is supported longitudinally along its upper load-bearing surface by a pair of longitudinally extending left and right L-shaped support and guide members 68 and 70, as illustrated in FIG. 4, which are mounted to the inside walls of the planter, such as, for example, by welding.

Front shaft 50 is driven by an externally-mounted drive means indicated generally by the reference numeral 51 in FIG. 4. Drive means 51 comprises a laterally extending horizontal support 54 upon which is mounted a motor 56, which preferably comprises a hydraulic turbine. Upon the shaft of motor 56 is mounted a sprocket wheel 58 which is operatively engaged with another sprocket wheel 52 mounted on shaft 50 via a sprocket chain 60. Accordingly, conveyor type flooring 38 may be moved in either a forward or reverse direction under appropriate actuation of hydraulic motor 56 which is transmitted to rotate shaft 50 in the manner just described.

Extending forwardly and downwardly from the lower portion of the forward hopper assembly 166 are a pair of downwardly inclined guide chute members 72 and 74 which serve to deliver the cut stalks of sugar cane to the pre-formed furrows located therebelow, all in a manner to be described in more detail hereinafter.

Extending transversely across the top of the sugar cane planter intermediate the forward hopper assembly 166 and the rear of the cart is a cross-cutting assembly which is indicated generally by the reference numeral 100. Cross-cutting assembly 100, perhaps best illustrated in FIG. 4, comprises a horizontal support member 78 which, for example, may comprise a planar steel plate welded to the outer lower longitudinal side wall support member 26. Secured to the top surface of horizontal support member 78 is a hollow cylindrical female pivot support 80. Pivotally mounted within female support 80 is a cylindrical male pivot member 82. Mounted to the top of the cylindrical male pivot member 82 is a left end frame plate 84 of the cross cutting assembly 100. Positioned on the right side of the planter symmetrically with respect to frame plate 84 is a right frame plate 86, frame plates 84 and 86 being connected by a transverse connecting guide member 88.

Mounted intermediate left and right frame plates 84 and 86 and constrained to move along transverse connecting guide member 88 is a horizontal support member 90. Horizontal support member 90 is designed to be guided laterally across the width of the planter by means to be described in more detail hereinafter. Mounted on the top of member 90 is a motor 92 which may preferably comprise a hydraulic turbine. Extending downwardly from the underside of horizontal support member 90 is the cross-cutting means which in a preferred embodiment comprises a chain saw which derives its power from motor 92. As seen in FIG. 4, a small sprocket wheel 96 is positioned on the shaft of motor 92 and is linked to a second small sprocket wheel 98 about a pulley of which is wrapped chain saw 94 via a sprocket chain 102. Note with respect to the saw 94 that its lower end is angled forwardly of its upper end to ensure that all the sugar cane in the cart will be cut, opening 186 (FIG. 2) in the right side of the planter serving to accommodate the saw 94 in its extreme rightward position as indicated in dotted outline in FIG. 4 by reference numeral 94'.

Extending forwardly of horizontal support member 90 of cross cutting assembly 100 are a pair of parallel upper support arms 112 which form the basic support elements for what is referred to as a kicker-chain assembly and indicated generally by the reference numeral 20. Kicker chain assembly 120 includes the forwardly projecting parallel upper support arms 112 and the cross frame members connecting same 114 (FIG. 1).

Note that the motor 92 for driving cross-cutting chain saw 94 has a second sprocket wheel 104 positioned on its output shaft. Sprocket wheel 104 is operatively connected via a sprocket chain 106 to yet another sprocket wheel 108 which is positioned on a main shaft 110 of the kicker chain assembly 120. Shaft 110 is therefore conveniently driven by the same motor 92 which is responsible for driving the chain saw 94.

Shaft 110 of kicker chain assembly 120 extends through a pair of pillow-block bearings 116 which are mounted on cutting frame members 114 of kicker chain assembly 120 (FIG. 5). Also mounted on shaft 110 are a pair of upper sprocket wheels 118 which cooperate with a pair of lower sprocket wheels 122 for driving a pair of kicker chains 128 and 130, each of which are provided with a plurality of outwardly projecting rod-like members 132, the purpose of which will become more clear hereinafter.

The lower sprocket wheels 122 are mounted on a forwardly extending lower support arm 124 which is substantially parallel to the upper support arms 112. The kicker chain assembly 120 also includes a vertical frame member 126 for supporting lower support arm 124, and a transverse frame member 134 which extends between the forward position of arms 112 (FIG. 1).

Extending forwardly from the central portion of transverse frame member 134 is a shaft 136 upon the end of which is mounted a wheel 138 in a bearing which is free to rotate thereabout. In use, wheel 138 (FIG. 5) rolls on the upper surface of transverse upper front support member 168 of the forward hopper structure 166 to support the kicker chain assembly 120.

The lateral or transverse movement of the horizontal support member 90, to which is attached both the cutting element and the kicker chain assembly, is achieved by means of hydraulic mechanisms which include a hydraulic ram 140 (FIG. 1), which is mounted to the outer side wall of the sugar cane planter via a mounting bracket 142. Hydraulic ram 140 includes a piston 144 to the end of which is connected a rope 146. Rope 146 is routed to a post 152 (FIG. 4) located on the left edge of support member 90 via a pair of pulleys 148 and 150. Pulley 148 is mounted on the horizontal support member 78 adjacent female pivot 80, while pulley 150 is mounted on the upper left frame plate 84 of the cross cutting assembly 100.

On the opposite side of horizontal support member 90 is mounted a similar post 154 to which is connected a second rope 156. Rope 156 extends about a pulley 158 mounted on right support plate 86 to a winch motor 160 which is driven by a turbine 162. Turbine 162 and winch 160 are mounted on the left support plate 84.

Also mounted on the upper surface of right side plate 86 is a key 166 which serves as a means for locking the cross cutting assembly 100 in place. A hinged locking hook 164 (FIGS. 1 and 4) is designed to engage key 166 to lock assembly 100 in the transverse position illustrated in FIG. 4.

Also mounted on the forward portion of plate 78 is an operator's seat 202 and a hydraulic control panel 204 containing means for controlling the turbine motors 56, 92 and 162, as well as the lock member 164. The operator's seat 202 is also conveniently mounted such that handle 200 is easily manipulable therefrom and the entire cross cutting and kicker chain assemblies 100 and 120 may be easily viewed.

A hydraulic oil tank 76 is mounted on the frontal wall of the planter and is connected by hydraulic hoses (not shown) to a conventional hydraulic pump (not shown) which is standardly mounted on the rear of a conventional agricultural tractor with which the machine of the present invention is intended to be utilized. Hydraulic oil tank 76 is, in turn, connected to the hydraulic turbines 56, 92 and 162 for powering the various equipments of the present invention. The actual connections thereto are not illustrated inasmuch as they are conventional, as are the control panel 204 connections.

In operation, the sugar cane planter of the present invention is connected via hitch 178 to the rear of a conventional argicultural tractor which also supplies, as set forth above, power for operating the hydraulic motors. The horizontal support member 90 for the chain saw 94 and the kicker chain assembly 120 is first withdrawn to its left most position so as to fit within the area formed between vertical post 34' and 180 of the frame of the planter. The cross cutting assembly 100 is thereafter rotated about the pivot defined by pivot members 80 and 82 from its cutting position as illustrated in FIG. 1 in which it is positioned laterally across the width of the planter to its cane-loading position (not illustrated) in which it is positioned substantially parallel with the side walls of the planter.

The front door 192 is moved to the position illustrated in FIG. 5 in which it is inclined slightly towards the rear of the planter. In this position, sugar cane may then be loaded into the planter and the inclined door 192 serves as a means for ensuring same will remain upwardly of the hopper 72, 74. The uncut sugar cane stalks, which may be 5 or 6 feet in length, may then be loaded to the top level of the planter, care being taken not to exceed same, such that transverse guide member 88 may be easily placed on top of the stalks. After the entire planter has been positioned at the beginning of the pre-formed planting furrow, which is preferably longitudinally aligned with the lower opening 172 formed between hopper plates 72 and 74, the cross cutting assembly 100, along with the attached kicker chain assembly 120, are pivotally rotated from the side cane-loading position, counter-clockwise as viewed in FIG. 1, about the pivot defined by cylinders 80 and 82, to the position illustrated in FIG. 1 whereupon hinged locking hook 164 is actuated to lock onto associated key 166 to lock same into position.

When the tractor is put in motion, the operator, by means of control panel 204, activates turbine motor 92 which, in turn, actuates the chain saw 94 and the two kicker chains 128 and 130. Turbine motor 162 is also actuated which activates winch motor 160 to enable ropes 156 to pull support plate 190 transversely across the width of the planter along guide 88. This action serves to cut the stalks positioned forwardly of the saw 94 over hopper 72, 74, the cut cane dropping through the opening 172 to the furrow therebelow. The forward motion of the tractor distributes the cut sugar cane in the desired density.

The possibility of entanglement of the cut sugar cane is minimized by virtue of the provision of the kicker chain assembly 120 which, as seen in FIG. 1, "follows"

just behind saw 94 as support member 90 traverses the width of the planter to cut the cane. The kicker chains 128 and 130, being activated also by motor 92, serve to dislodge any cut cane stalks which may become entangled, to thereby aid their downward movement and distribution through hopper opening 172.

After the cross cutting assembly 100 reaches the right most portion of its travel, as indicated by position 94′ of the saw in FIG. 4, the support plate 90 is reciprocated back towards its left most starting position by activation of hydraulic ram 140 via control panel 204. Ram 140 draws rope 146, and hence, support 90, to the left as viewed in FIG. 4.

After the support member 90 has returned to its left most position, turbine motor 56 may be activated by the operator via control panel 204 to move the conveyor-type flooring 38 forwardly to convey the remaining stalks of sugar cane forwardly until front door 192 is again contacted, at which time turbine 56 is deactivated and turbines 92 and 162 are again activated to repeat the above-described procedure.

Naturally, the amount of sugar cane which is distributed is determined and may be regulated by the speed of the tractor pulling the planter of the present invention, and by the transverse speed of the cutting member 94. That is to say, it is clear that the planting operation is entirely within the control of the operator inasmuch as movement of the cross cutting assembly 100 may, at times, be either slowed down or speeded up in accordance with the movement of the tractor and other planting objectives.

Obviously, numerous modifications and variations of the present invention are possible in light of the above teachings. For example, the cross cutting assembly 100, kicker chain assembly 120 and hopper assembly 166 may just as easily be positioned at the rear of the cart. The frontal placement is, however, believed to be the best mode, inasmuch as it enables complete and accurate depositing of the cut stalks at the end of the rows of furrows, when the tractor must turn for the next row.

Further, additional supporting sprockets may be added underneath the conveyor-type floorings 38 to prevent sagging thereof. Another modification may be to add a small convveyor to the bottom of the hopper assembly 166 in order to transmit the cut pieces laterally to a side row parallel to the planter. Obviously, the various controls and operator's seat may be adjusted to provide optimum controllability and visibility. Also, the positions of the various turbine motors may be varied to optimize the operation thereof.

In view of the foregoing, it should therefore be understood that within the scope of the appended claims, the invention may be practiced otherwise than as specifically described hereinabove.

What is claimed as new and is desired to be secured by letters patent of the United States is:

1. A suger cane planter, which comprises:
   means for receiving a plurality of sugar cane stalks to be cut comprising a wheeled vehicle having substantially parallel side walls defining a stalk receiving area therebetween;
   means mounted on said receiving means and positioned on a cutting assembly located adjacent one end of said vehicle for cutting said plurality of stalks of sugar cane;
   means operatively connected to said cutting means for moving same across said receiving means transversely through said plurality of sugar cane stalks located therein; and
   wherein said vehicle includes hopper means positioned below said cutting assembly for delivering the cut sugar cane to the ground therebelow which comprises a pair of guide plates respectively attached to said parallel side walls and extending downwardly therefrom towards one another at an inclination so as to form a cane receiving aperture therebetween.

2. The sugar cane planter as set forth in claim 1, wherein said stalk receiving area includes means for conveying said stalks towards said cutting means.

3. The sugar cane planter as set forth in claim 1, wherein said cutting assembly is pivotable about one end thereof.

4. The sugar cane planter as set forth in claim 1, wherein said cutting assembly includes means positioned above said hopper means for urging the cut sugar cane downwardly.

5. The sugar cane planter as set forth in claim 4, wherein said downwardly urging means comprises kicker chain means operatively connected to said means for transversely moving said cutting means so as to be moved therewith.

6. The sugar cane planter as set forth in claim 5, wherein said cutting assembly comprises means for supporting said cutting means and said kicker chain means, end support means positioned adjacent said parallel side walls, and means extending between said end support means for guiding said supporting means therebetween.

7. The sugar cane planter as set forth in claim 6, wherein said cutting means comprises an elongated chain saw attached to said support means and extending downwardly therefrom.

8. The sugar cane planter as set forth in claim 7, wherein said elongated chain saw is angled downwardly and forwardly of its point of attachment to said support means.

9. The sugar cane planter as set forth in claim 6, wherein said cutting assembly extends transversely across the top portion of one end of said vehicle.

10. The sugar cane planter as set forth in claim 9, wherein said kicker chain means includes a support frame which extends forwardly from said supporting means.

11. The sugar cane planter as set forth in claim 10, further comprising means for driving said cutting means and said kicker chain means mounted on said supporting means.

12. The sugar cane planter as set forth in claim 6, wherein said moving means includes hydraulically operated means for selectively moving said supporting means along said guiding means between said end support means.

13. The sugar cane planter as set forth in claim 11, wherein said driving means comprises motor means having an output shaft operatively connected to said cutting means and to a second shaft to which said kicker chain means are operatively connected.

14. The sugar cane planter as set forth in claim 13, wherein said cutting means comprises an elongated chain saw attached to said supporting means and extending downwardly therefrom.

15. The sugar cane planter as set forth in claim 14, wherein said kicker chain means comprises at least one kicker chain substantially vertically disposed on said cutting assembly and spaced laterally of said chain saw so as to follow behind said chain saw when said supporting means is moved transversely across said vehicle to cut said sugar cane.

16. The sugar cane planter as set forth in claim 15, wherein said elongated chain saw is angled downwardly and forwardly of its point of attachment to said supporting means.

17. The sugar cane planter as set forth in claim 3, wherein said conveying means comprises a front shaft, a rear shaft, means for driving one of said shafts, endless flexible flooring means extending about and between said front and rear shafts, and sprocket wheel means operatively connecting said shafts to said endless flexible flooring means so as to move same therewith.

18. The sugar cane planter as set forth in claim 17, wherein said cutting means is positioned adjacent one end of said flexible flooring means.

19. A sugar cane planter, which comprises:
means for receiving a plurality of sugar cane stalks to be cut;
means mounted on said receiving means for cutting said plurality of stalks of sugar cane;
means operatively connected to said cutting means for moving same across said receiving means transversely through said plurality of sugar cane stalks located therein; and
means positioned adjacent said cutting means for urging the cut sugar cane downwardly;
said downwardly urging means comprising kicker chain means operatively connected to said means for transversely moving said cutting means so as to be moved therewith.

20. A sugar cane planter, which comprises:
means for receiving a plurality of sugar cane stalks to be cut;
means mounted on said receiving means for cutting said plurality of stalks of sugar cane;
means operatively connected to said cutting means for moving same across said receiving means transversely through said plurality of sugar cane stalks located therein; and
wherein said sugar cane stalk receiving means comprises a wheeled vehicle having substantially parallel side walls defining a stalk receiving area therebetween;
said moving means comprising a hydraulic ram connected to the outside of one of said side walls and rope and pulley means connected said ram to a mounting plate underneath which is mounted said cutting means, for reciprocal movement of said plate between said side walls.

21. The sugar cane planter as set forth in claim 20, wherein said mounting plate has means extending therethrough for guiding same between a pair of end supports positioned respectively adjacent said side walls of said vehicle.

22. The sugar cane planter as set forth in claim 21, further comprising pivot means connected to one of said end supports for pivotal movement of said cutting means between a cutting position transverse to said side walls to a loading position parallel to said side walls.

23. A sugar cane planter, which comprises:
means for receiving a plurality of sugar cane stalks to be cut;
means mounted on said receiving means for cutting said plurality of sugar cane stalks;
means for laterally moving said cutting means transversely across the width of said receiving means through said plurality of sugar cane stalks located therein so as to cut said plurality of stalks; and
kicker chain means operatively connected to said cutting means and positioned adjacent thereto and movable therewith for urging the cut sugar cane downwardly.

* * * * *